Dec. 12, 1967 G. W. PAINTER ET AL 3,358,257
FORCE AND MOMENT TRANSDUCER
Filed Dec. 27, 1965 3 Sheets-Sheet 1
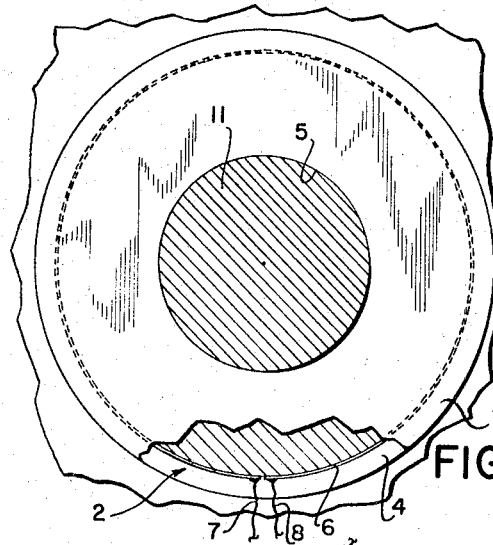
FIG. 1
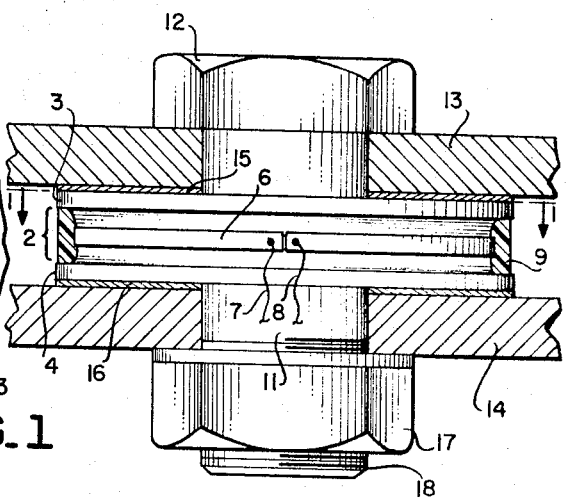
FIG. 2
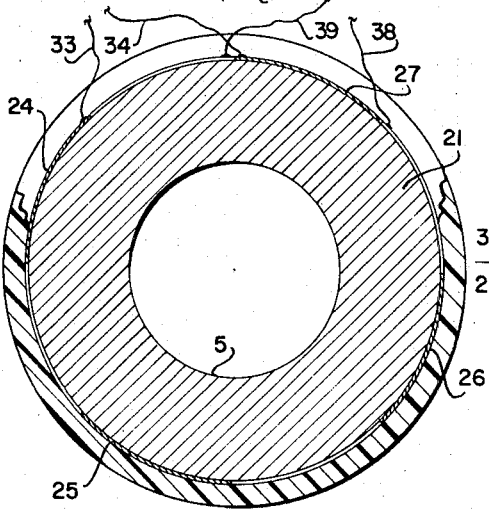
FIG. 3
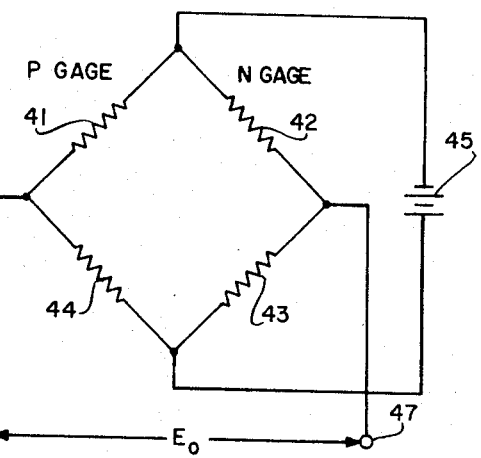
FIG. 4
FIG. 5
INVENTORS
GILES W. PAINTER
WARD B. BREWER
BY *George A. Sullivan*
Agent

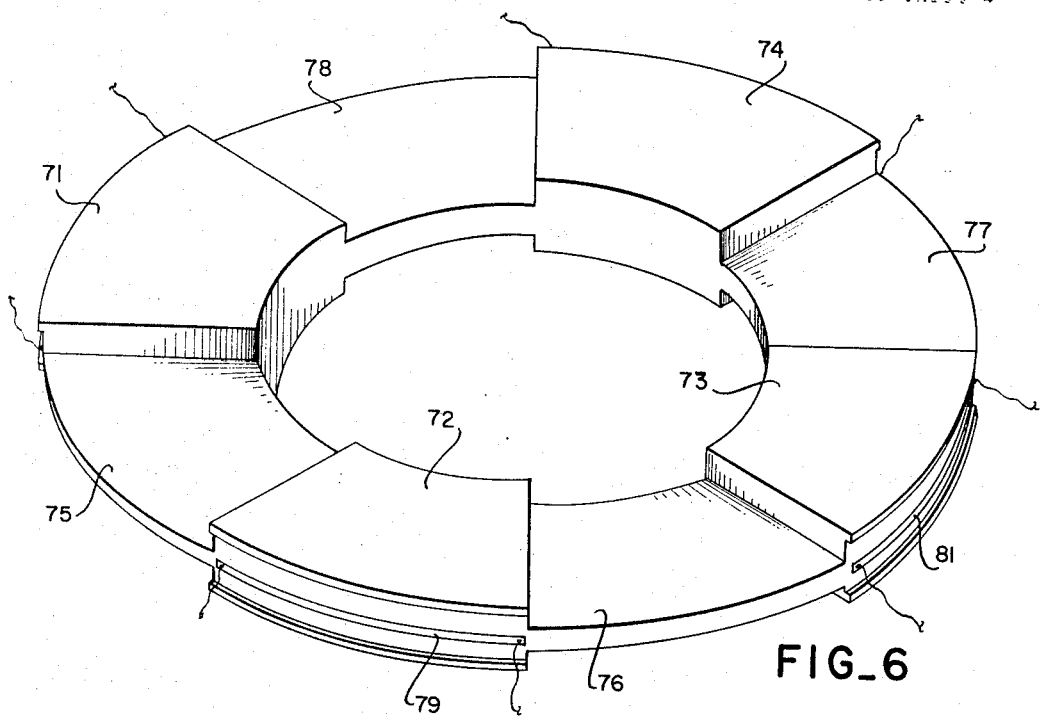
FIG_6
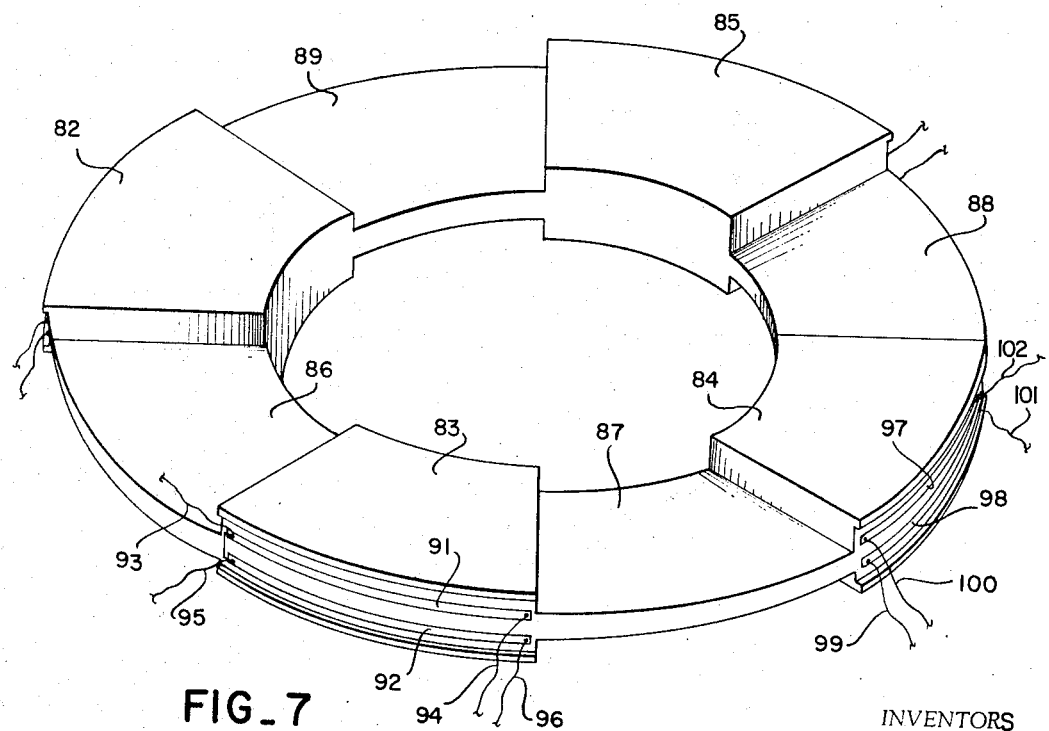
FIG_7

Dec. 12, 1967  G. W. PAINTER ETAL  3,358,257
FORCE AND MOMENT TRANSDUCER
Filed Dec. 27, 1965  3 Sheets-Sheet 3
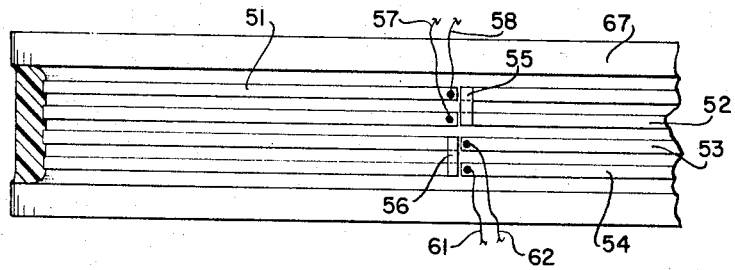
FIG_8
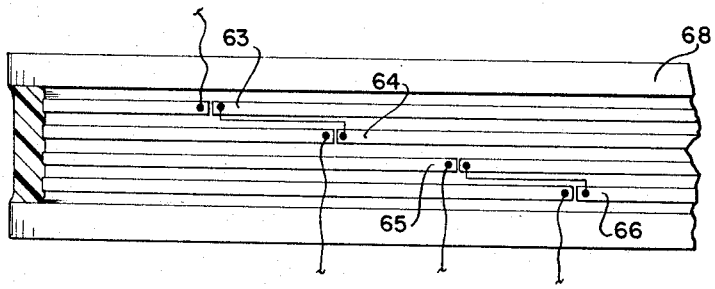
FIG_9
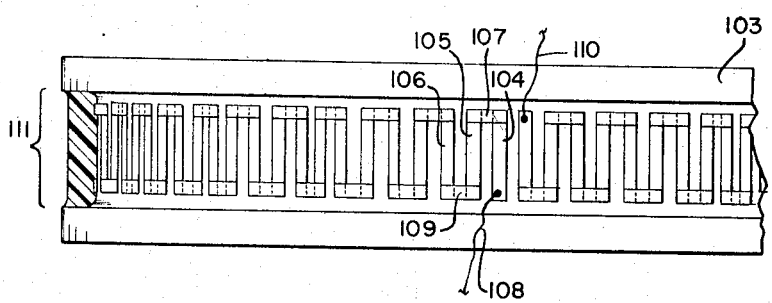
FIG_10
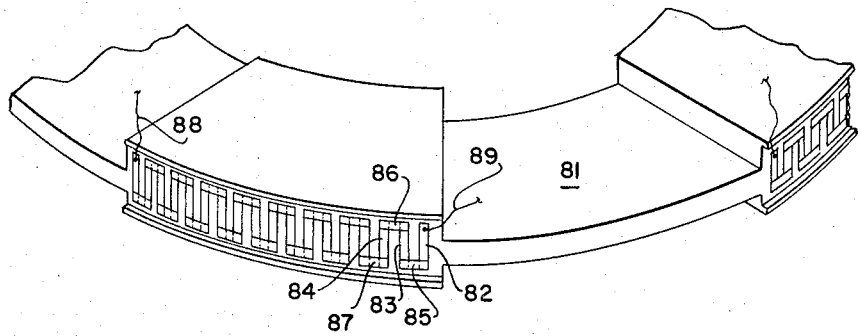
FIG_11
INVENTOR.
GILES W. PAINTER
WARD B. BREWER
BY
Agent United States Patent Office 3,358,257
Patented Dec. 12, 1967

3,358,257
FORCE AND MOMENT TRANSDUCER
Giles W. Painter, Granada Hills, and Ward B. Brewer, Sepulveda, Calif., assignors to Lockheed Aircraft Corporation, Burbank, Calif.
Filed Dec. 27, 1965, Ser. No. 516,649
11 Claims. (Cl. 338—5)

ABSTRACT OF THE DISCLOSURE

Both static and dynamic force may be measured by a spool-shaped, strain-responsive transducer. Semiconductor piezoresistive ribbons of complementary symmetry, comprising the active strain-responsive elements, are connected into a two or four arm active bridge circuit. Relieved areas of the spool-shaped member selectively distribute the applied load to separate strain-responsive elements and thereby provide measurements of moment as well as force.

---

This invention provides novel and improved apparatus for the measurement of forces and moments and in its preferred embodiment comprises a washer with piezoresistive strain sensing elements. Various types of force measuring transducers have been proposed heretofore which incorporate resistance type strain gages. Typical of these prior transducers are those shown and described in Patents No. 2,998,585 to Bodner et al., and No. 3,036,283 to Singdale et al., both of which are assigned to the same assignee as the present application. Notwithstanding the significant utility of these prior devices, there are certain kinds of dynamic structural measurements which cannot effectively be obtained through their use. One important force measurement problem that cannot be solved by the use of conventional transducers is encountered in the determination of dynamic loads applied to a mass attached to a non-rigid structure. A typical case is the measurement of a force transmitted through the attachment brackets used to mount mobile electronic equipment. In such cases it is necessary that the transducer be placed between the supporting structure and the equipment. Since the loads are dynamic, it is necessary that the transducer be small, rigid and light so as to produce no significant changes in the dynamic response characteristics of the structure. This requirement has not been satisfactorily met by prior devices.

Also, in the design and development of aerospace vehicles it is often necessary to determine the force that is transmitted between the vehicles supporting structure and attached equipment. Force determinations, based on laboratory mechanical impedance measurements and the accelerations which are measured during operation, are inherently difficult and often virtually impossible to obtain. The direct measurement of force also presents problems, since conventional force transducers are generally too large, too heavy, and too compliant to be employed in aerospace service environments. By the present invention there is provided a miniature force transducer which has a "washer" configuration and which incorporates highly sensitive piezoresistance strain responsive elements. These transducers are sufficiently sensitive to allow measurement of forces as low as a few pounds, yet their mass and compliance are so low that they can be introduced between the equipment and the supporting structure with negligible effect on the response characteristics of the system. The transducer of the invention is particularly suitable for placement between an attachment bracket and a supporting structure and is capable of sensing dynamic loads which are far less than the tension force in the attachment fastener.

Conventional transducer designs, in order to reduce the error introduced by a non-uniform stress field in the vicinity of the load application point, require that they be made sufficiently long to achieve a uniform stress in the area of the strain gage attachment.

It is highly desirable to have a full- or half-bridge circuit attached to the transducer in order to provide temperature compensation and increase sensitivity. Prior devices are not well suited to the incorporation of a full-bridge or a half-bridge on the body of the transducer. The transducer of the present invention differs from prior "washer" type devices in the construction and arrangement of the strain sensitive elements. Instead of having a single strain gage wire encircling the periphery of the washer, certain embodiments of the present invention incorporate a group of separate piezoresistive elements. These strain sensitive elements are made from P- and N-type semiconductor materials rather than conventional strain sensitive resistance wire. Since semiconductor piezoresistive materials can be selected to provide either an increase or a decrease in resistance with a given direction of strain, it is possible to construct a strain gage bridge whose arms will each provide in-phase resistance changes when a force is applied to the washer faces. The present invention, therefore, has advantages over prior devices and in addition incorporates either a complete or partial strain gage bridge with its attendant advantages. Also, as will appear hereinafter, the transducer of the present invention can be modified to allow measurement of the amplitude and direction of transmitted moment.

Therefore, it is a principal object of the present invention to provide a novel and improved force sensing device which gives a substantially linear electrical output indicative of applied force.

It is another object of the invention to provide a novel and improved force and moment measuring transducer having a mass and a compliance which are sufficiently small to allow its incorporation into a test system without resulting in significant changes in the dynamic response of the system.

It is yet another object of the invention to provide a novel and improved force or moment transducer having better sensitivity and accuracy than prior devices of this general type.

Yet another object of the invention is to provide a novel and improved force or moment transducer which is capable of withstanding high static and dynamic force levels.

A general object of this invention is to provide a novel and improved force measuring transducer which overcomes disadvantages of previous means and methods heretofore intended to accomplish generally similar purposes.

These and other objects of the invention will in part be obvious and will in part appear hereinafter.

The invention will be understood more completely from the following detailed description, taken in conjunction with the drawings, in which:

FIGURE 1 is a plan section view taken along line 1—1 of FIGURE 2, and partially broken away, showing a first embodiment of the invention utilizing a single piezoresistive element;

FIGURE 2 is an elevation view, partially in section, of the apparatus of FIGURE 1 illustrating the manner in which the invention is utilized in conjunction with related structures;

FIGURE 3 is a plan section view, taken along line 3—3 of FIGURE 4, of an alternative embodiment of the invention employing multiple piezoresistive elements in a bridge arrangement;

FIGURE 4 is an elevation view of the apparatus of FIGURE 3, partially in section;

FIGURE 5 is a schematic circuit diagram illustrating a bridge measuring circuit as utilized in the practice of certain forms of the invention;

FIGURE 6 is a perspective view of a moment gage constructed in accordance with one embodiment of the invention;

FIGURE 7 is a modified form of the moment transducer apparatus of FIGURE 6;

FIGURE 8 illustrates still another modification of a force transducer embodiment of the invention employing multiple piezoresistive elements in an in-line configuration;

FIGURE 9 illustrates a modification of the apparatus of FIGURE 8 employing a staggered configuration of the multiple piezoresistive elements;

FIGURE 10 illustrates a force transducer embodiment of the invention, which is responsive to axial strain; and FIGURE 11 illustrates a moment transducer in accordance with the invention, which is responsive to axially applied moments.

Looking first at FIGURE 1 there is shown a force transducer constructed in accordance with the simplest form of the invention. This embodiment comprises a spool-shaped washer 1 having a shallow annular groove portion 2 with a pair of relatively narrow flanges 3 and 4, and an axial hole 5 extending through the center thereof. The washer 1 may be fabricated of stainless steel, but in a preferred embodiment beryllium copper has been found to be more satisfactory since its lower modulus of elasticity provides increased sensitivity. The central hole 5 is of a size to receive a bolt or similar fastening member, as will appear hereinafter. In a typical construction the washer 1 is fabricated from beryllium copper, has an inside diameter of 0.5 inch, and has a thickness of 0.20 inch. The weight of the complete device is 0.12 ounce and the spring rate is $14 \times 10^6$ pounds per inch. A piezoresistive semiconductor ribbon 6 is adhesively bonded to the periphery of washer 1 in the center of groove portion 2. Ribbon 6 is responsive to circumferential strain to produce a change in electrical resistance. Each end of ribbon 6 is welded to a corresponding lead wire, indicated at 7 and 8. Leads 7 and 8 may be insulated in any suitable and well-known manner. Ribbon 6 is bonded to washer 1, in groove 2, by means of a suitable bonding agent such as cyanoacrylate or epoxy adhesive. In addition to securing ribbon 6 to washer 1, the bonding agent insulates the ribbon 6 from the washer 1 to provide electrical isolation therefrom. After the ribbon 6 has been bonded to the washer 1, the groove 2 may be filled with a suitable potting compound 9, which, for example, may be an epoxy. Leads 7 and 8 extend through the potting compound 9, as shown in FIGURE 2.

The piezoresistive semiconductor ribbon 6 has a substantially rectangular cross-section and preferably is disposed in the central plane passing transversely through the washer 1. The ends of the ribbon 6, to which leads 7 and 8 are attached, preferably are separated by the smallest possible gap sufficient to provide electrical isolation between the ribbon ends.

In use, a force is applied to upper and lower faces of the washer (as viewed in FIGURE 2) thus causing a radial expansion of the washer 1 and an attendant stress along the length of ribbon 6. This stress will change the electrical resistivity of the ribbon 6 and may be sensed by any suitable and well-known resistance measuring apparatus. Suitable measuring apparatus is well known to those versed in the strain-gage are and since the invention is not limited to any particular type of ancillary measuring apparatus, the external measuring equipment is not shown.

The arrangement of the transducer for actual operation is shown in FIGURE 2. The shank 11 of bolt 12 is inserted through hole 5 of the transducer and through the openings provided in structural members 13 and 14.

In order to minimize hysteresis introduced by friction forces that oppose radial expansion under increasing axial force, it is preferred that thin metallic washers 15 and 16 (0.01 inch thick) coated with Teflon be introduced between the transducer and its adjacent load bearing surfaces. It should be understood, however, that washer 1 itself may be impregnated, sintered, or coated with Teflon or similar material, thus eliminating separate washers 15 and 16. Shank 11 of bolt 12 is inserted through the opening in structural member 13, washer 15 is placed over shank 11, and shank 11 is inserted through the hole 5 in the transducer. Washer 16 is placed over shank 9, shank 11 extends through structural member 14, and nut 17 is rotated about shank 11, on threaded portion 18, in a direction to secure member 13 to member 14. Any static or dynamic pressure force applied to the flat surfaces of the transducer will produce a "barreling effect" on the circumference of washer 1 and thereby impart a circumferential strain to ribbon 6. That is, there is a radial component extending outwardly from the central axis of shank 11 and washer 1 as a result of a force applied to the flat faces of washer 1. The strain produced in ribbon 6 is proportional to the force applied and results in a change in the electrical resistance of ribbon 6, as mentioned hereinabove.

Ribbon 6 is fabricated from a single crystal of germanium or silicon which has been suitably doped to provide the desired electrical characteristics and in a typical embodiment measures 0.001 inch in width and ¼ to ½ inch long. In a typical construction, ribbon 6 has a gage factor of 175. The term "gage factor," as applied to the strain-gage art, is a measure of sensitivity which is defined as the ratio of the increment of change in resistance to total gage resistance divided by the ratio of increment of change in gage length to its total length.

Heretofore, attempts have been made to employ barium titanate or similar piezoelectric materials in order to obtain a high gage factor and a high signal level. However, the high internal impedance of such materials, usually many megohms, frequently results in a noisy signal, particularly if long cable runs are necessary to carry the signal to its destination. A semiconductor strain-gage as employed in the present invention has a much lower internal impedance, thus minimizing the induced noise problem. The nominal resistance value can be adjusted to be between approximately 50 and 50,000 ohms as required to provide impedance matching with various ancillary equipment such as a telemetry oscillator or a signal-conditioning amplifier.

Other advantages of the present invention over the above-described piezoelectric crystal devices is that the present invention is much less fragile and is also capable of measuring static as well as dynamic stresses. Furthermore, in most applications the present invention permits readings to be obtained without the use of electronic amplification.

There are a number of semiconductor materials such as silicon, germanium, and indium-antimonide which exhibit piezoresistive properties and which may be used in the fabrication of the strain-responsive ribbons of the various embodiments of the present invention. In a typical embodiment of the invention, the strain-sensitive element may be made of P-type silicon cut in the 111 direction, and have cross-sectional dimensions of 0.006 by 0.001 inch. The length will, of course, be determined by the peripheral dimensions of the transducer body to which it is applied.

There is shown in FIGURES 3 and 4 a modification of the invention which employs both P-type and N-type piezoresistive semiconductor elements.

By employing P-type and N-type semiconductor ribbons in conjugate bridge arms of the measuring circuit the output of both ribbons, when subjected to strain of the same kind (e.g. tension), will be additive. If the individual outputs are non-linear in different directions the total output will be linearized. This same type of P-N combination may also be employed for inherent temperature compensation, as will be described hereinafter.

By choosing the correct bridge configuration, all of the elements will contribute to the transducer output when forces are applied to the faces of the transducer. Ideally, the sensitivities and the locations of the strain responsive elements should be such that no output is present when one-half of the washer undergoes an increase in axial compression stress, and the remaining half a corresponding decrease in stress. One arrangement for accomplishing this objective is shown in FIGURES 3 and 4, and utilizes four pairs of strain responsive elements, each pair of which covers a 90° arc of the circumference of the washer. Looking particularly at FIGURES 3 and 4, there is shown such an embodiment of the invention. Washer body 21 is provided with a pair of flat parallel faces and an annular groove 23 therebetween. The first set of strain-responsive elements comprises semiconductor ribbons 24–27 which may be made of P-type semiconductor material. The second set of strain responsive elements comprises a like number of N-type semiconductor ribbons, two of which are indicated at 28 and 29 in FIGURE 4. The P-type ribbons 24–27 are connected in series by means of interconnecting conductors, two of which are shown at 31 and 32. Leads 33 and 34 are connected to corresponding terminal ends of semiconductors 24 and 27. Similarly, the remaining four semiconductor ribbons (e.g. 28–29) are connected in series: two of the interconnecting conductors for this set being indicated at 35 and 36. Leads 38 and 39 connect to the terminals of the N-type series of semiconductor ribbons.

As in the embodiment of FIGURES 1 and 2, the semiconductor ribbons 24–27 and 28–29 are bonded to the washer body 21 by a suitable bonding agent in order to transfer the strain applied to the transducer to the ribbons and to provide electrical isolation from the washer body 21. The peripheral groove 23 may be filled with a suitable potting compound 37.

Looking now at FIGURE 5 there is shown a simple Wheatstone-bridge circuit of the type which may be used in conjunction with the transducer of the embodiment shown in FIGURES 3 and 4. This bridge circuit comprises active arms 41 and 42 and fixed arms 43 and 44. Arm 41 comprises the total resistance of the P-type ribbons 24–27. Arm 42 comprises the total resistance of the N-type ribbons (28–29). Arms 43 and 44 each comprise fixed resistances. The bridge is excited from a suitable reference power supply 45. The bridge output $E_o$ appears across terminals 46 and 47, which may be connected to a galvanometer or other suitable indicating or recording device. If each strain responsive element has a uniform sensitivity per unit length, it will be sufficient to have one set of opposing strain responsive elements of the P-type and the remaining opposing set of the N-type. It will be necessary, furthermore, that all strain responsive elements have the same sensitivity. It is unnecessary for the length of the P-type strain responsive elements to be the same as that of the N-type strain responsive elements. For instance, the P-type elements may each span an arc of 120° while the N-type elements may each span arcs of 60°. Furthermore, each strain-responsive element may almost completely span the entire circumference of the washer body (so long as the two ends of any element are not allowed to contact one another).

Examples of multiple element transducers are shown in FIGURES 8 and 9. In the embodiment of FIGURE 8 the strain-sensitive elements 51–54 are placed end-to-end around the washer with their ends aligned. Elements 51 and 52 are connected in series by means of connecting conductor 55. Similarly, elements 53 and 54 are serially connected via conductor 56. Leads 57–58 connect to elements 51–52 and leads 61–62 connect to elements 53–54. In FIGURE 9 there is shown a modification which differs from that of FIGURE 8 in that a staggered arrangement of the ends of the strain-responsive ribbons is employed. That is, the ends of ribbon 63 are angularly displaced from the ends of ribbon 64. Similarly, the ends of ribbons 65 and 66 are further displaced so that none of the ribbons have mutually aligned ends. The arrangement shown in FIGURE 8 is easier to fabricate than is the arrangement of FIGURE 9. However, the arrangement shown in FIGURE 9 is preferred since it is less sensitive to applied moments. This is due to the fact that the gap between the ends of the strain-responsive elements are staggered at intervals around the periphery. Although the gaps between the ends of ribbons 63–66 are shown displaced by less than 90°, a preferred construction would be to space the gaps 90° apart. The smaller displacement has been shown in FIGURE 9 for clarity in illustrating a staggered relationship. Whether staggered or placed end-to-end, the elements cover as much of the circumference of their respective washers 67 or 68 as is possible so as to assure that the transducer integrates the total force acting upon it.

In general, any design should incorporate an equal number of P-type and N-type piezoresistive elements. Ribbons 51–54 and 63–66, shown in FIGURE 8, should be of such length and so located that any continuous 180° arc around the circumference of the washer (67 or 68) will incorporate the same P-type and N-type ribbon lengths as does the remaining 180° arc. It should be understood that either a two-element (one P-type and one N-type) transducer, forming a half-bridge, may be constructed within the teaching of this invention, as well as the fullbridge shown in FIGURES 3 and 4.

The embodiments of the invention described in connection with FIGURES 1–4 are responsive directly to force. There will now be described embodiments of the invention which are responsive directly to moment. Moment data are obtained by dividing the washer into quadrants and providing each of the quadrants of the washer with separate bride elements. By suitably combining the bridge elements in an external circuit, the opposing quadrants of the washer may be combined to give a vector indicative of moment. In a typical construction the upper and lower surfaces of the washer body are modified by removing certain areas so that four thicker quadrant sections are separated from one another. The strain sensitive semiconductor strips are placed along the edges of only the four quadrant areas. In this case separate readings are obtained from the two pairs of opposite load carrying segments. These readings are combined, vectorially, to give the total moment transmitted.

The device shown in FIGURE 6 comprises a washer-shaped body having four segments 71–74 of a first thickness which are contiguous with intervening segments 75–78 having a reduced thickness. The central plane of segments 71–74 is co-planar with the central plane of segments 75–78. Preferably, the washer body is an integral structure, fabricated from beryllium-copper or other suitable alloy. The relieved areas which divide the upper and lower faces of the body confine applied axial moments to the thicker segments 71–74. The segments are provided with strain-responsive elements disposed along their peripheral edges. For example, segment 72 is provided with strain-responsive ribbon 79 and segment 73 is provided with strain-responsive ribbon 81.

The embodiment of the invention shown in FIGURE 7 is similar to the moment transducer of FIGURE 6 in that it comprises a washer having raised segments 82–85 and intervening segments 86–89 of reduced thickness. However, the embodiment of FIGURE 7 is provided with pairs of strain-responsive ribbons on each segment. Specifically, segment 83 is provided with a P-type ribbon 91 and an N-type ribbon 92. These may be connected into a half-bridge measuring circuit via leads 93–96. Segment 84 is similarly provided with P-type ribbon 97 and N-type ribbon 98 and may be connected into a half-bridge measuring circuit via leads 99–102. Segments 82 and 85 are similarly provided with pairs of P- and N-type ribbons, although these cannot be seen in the view of FIGURE 7. The manner in which the strain-responsive ribbons are bonded to the washer body and electrically insulated therefrom is similar to that described above in connection with the force measuring transducer embodiment of the invention.

As indicated hereinabove, a force applied to the face of the transducer will result in a radial expansion of the washer body and cause a strain to be transmitted to the piezoresistive element disposed along the periphery of the washer body. However, the invention may be modified so that the piezoresistive element is directly responsive to axial stress. Such a modification will now be described.

Referring now to FIGURE 10 there is shown a spool-shaped washer 103 essentially identical to spool 68 shown in FIGURE 9. However, in this arrangement a plurality of semiconductor, strain-responsive, elements are arranged about the periphery of the washer 103 with their major axes parallel to the central axis of the washer. Three of these elements are indicated at 104–106. That is, the individual elements 104–106 are aligned to have their major axes aligned in the same direction as the axis of the transverse hole. The ends of each element are connected in series by means of short segments of conductive ribbons. For example, element 104 has its upper terminus (as viewed in FIGURE 10) connected to one end of conductor ribbon 107. Conductor ribbon 107 is fabricated of a material which has essentially no change in resistance with applied stress. The opposite end of conductor ribbon 107 is attached to the upper end of element 105. The lower terminus of element 104 is attached to lead wire 108 which in turn may be connected to the external measuring bridge. The lower end of element 105 is connected to one end of conductor ribbon 109 and the remaining end of conductor ribbon 109 is attached to the lower end of element 106 and so forth. The several piezoresistive elements are connected in series with the opposite end of the series terminating with lead wire 110. The several elements are bonded to a periphery of washer body 103. The bonding material may, for example, comprise an epoxy adhesive which, in addition to securing the several elements to the periphery of the washer body, also serves to provide electrical isolation between the elements and the washer body so that the electrical path will be through the elements and will not be shorted by the washer. If desired, the groove 111 may be filled with a suitable potting material in the same manner as shown in the embodiments of FIGURES 8 and 9. By employing a plurality of serially-connected strain sensitive elements the strain sensitivity of this embodiment of the invention can be made to exceed that of the radially responsive device described in connection with FIGURES 1 and 2.

The technique of arranging the strain-responsive elements to be directly responsive to axial stress rather than to circumferential stress derived from a radially applied load may also be extended to the moment transducer and such arrangement is shown in FIGURE 11. Referring to FIGURE 11 there is shown a fragmentary view of a modified form of a moment transducer. The washer body 81 is substantially the same as the body shown in FIGURES 6 and 7. Only a portion of the washer body 81 is shown in FIGURE 11, it being understood that the remaining portion is essentially the same as the body configuration shown in FIGURES 6 and 7. In this embodiment, the several piezoresistive elements are aligned in parallel so that their major axes extend between the faces of the sectors of the washer body 81 and are parallel to the axis of the central hole. Three of the elements are indicated at 82–84. The ends of the elements 82–84 are connected in series by means of corresponding ones of ribbon conductors 85–87 in a manner similar to that shown in FIGURE 10. As in the embodiment of FIGURE 10, the several elements (82–84) are adhesively bonded to the periphery of the washer body 81 by an epoxy adhesive or other suitable material capable of transmitting the applied stress while simultaneously providing electrical isolation from the washer body 81.

Lead wires 88–89 connect to the ends of the series of elements. In order that any of the above described embodiments of the invention can extend and retract freely under load, the means for reducing friction may be interposed between the faces of the transducer and the surface of structural members to which it is secured. Without providing such friction reducing means, the calibration test of the transducer may show an appreciable amount of hysteresis. Preferably, the friction reducing means may take the form of a thin washer of lead foil, Teflon, or similar material, or a coated washer as indicated at 15 and 16 in FIGURE 2, which acts as a high-pressure solid lubricant so that when load forces are applied to the transducer, the main body portions and flanges may flex in response to the applied load.

Other modifications may be applied to any of the above described embodiments. For example, there are several ways in which the zero shift of apparent strain due to temperature change can be compensated. One of the most straightforward and simple is the use of a "dummy gage." This technique has been employed extensively in the prior art for use with wire and foil type strain gages in the prior art. The half-bridge or full-bridge arrangements made available by the use of pairs of semiconductor ribbons provides automatic temperature compensation as well as increased force and moment sensitivity. This technique is implemented by mounting a ribbon made of the same material as the strain-responsive ribbon near the active ribbon in such a manner that it is subjected to the same temperature as the active ribbon but is not subjected to strain. Placing these two elements in adjacent arms of the Wheatstone bridge will cause the resistance changes due to temperature to cancel at the output. This procedure is applicable to all of the embodiments of the invention described herein.

The half-bridge utilizes a P-type (positive gage factor) element in conjugate bridge arms with an N-type (negative gage factor) element. Since both types of elements have positive temperature coefficients, self-temperature compensation will result if care is exercised in the selection of the proper ribbons. Other well-known methods of temperature compensation may be applied to the present invention. An additional advantage of the combination of P- and N-type elements is that a fully active four-arm bridge may be placed on a single washer body.

As will be apparent to those skilled in the art, various substitutions, omissions, and changes in form and details of the devices illustrated may be made without departing from the scope of the invention. For example, the strain responsive elements need not be separately fabricated and thereafter bonded to the washer, but may be fabricated and applied by various other techniques. For example, the washer itself may be fabricated from a pure semiconducting material such as pure germanium and thereafter, a dopant may be diffused into the periphery of the washer at suitable locations to provide the desired semiconducting properties along the periphery of the washer. Suitable leads may be welded directly to the periphery of the washer at appropriate locations. Alternatively, the strain sensitive element may comprise a ribbon of pure silicon or other semiconductor material which is applied to the entire periphery of the washer with the exception of a single hairline gap, to provide the requisite electrical isolation, and thereafter the ribbon may have the necessary impurities diffused into it to provide the desired piezoresistive properties.

The superior performance of the invention described in the foregoing specification is based on the following features:

(1) Utilization of Poisson's effect for producing the strain measurement;

(2) The use of the piezoresistive property of semiconductors to provide a high gage factor;

(3) Since the periphery of the transducer body is effectively encircled by the strain-responsive element, there is an improved averaging of non-uniformly applied loads;

(4) The use of P-type and N-type elements allows a half-bridge or a full-bridge to be carried on the transducer body;

(5) In certain embodiments the strain-responsive elements each cover only a portion of the circumference of the washer instead of passing one or more times around the periphery as in the case of prior devices;

(6) Certain embodiments of the transducer have the capability of producing a signal that is proportional to the applied moment;

(7) Embodiments of the invention may be made to be sensitive to either axial or circumferential strain, the axial strain responsive embodiment having an increase in sensitivity and a diminution of undesirable surface friction effects.

Having described only typical forms of the invention we do not wish to be limited to the specific details herein set forth, but wish to reserve to oursleves any variations or modifications that may appear to those skilled in the art and fall within the scope of the following claims.

We claim:

1. A force measuring transducer comprising:
a circular washer-shaped body having parallel flat end faces, a right-cylindrical central periphery, and an axially disposed aperture therethrough;
a piezoresistive semiconductor ribbon encircling the entire central periphery of said body in a single plane and having a gap therein sufficient to provide a circuit discontinuity between the coplanar ends thereof, the ratio of the axial length of said body to the axial width of said ribbon being approximately 200:1 to provide a highly uniform stress field in the area of said ribbon;
a thin layer of insulative bonding material for securing said semiconductor ribbon to said body and for providing electrical isolation therefrom; and
a pair of lead means connected to respective ones of the ends of said ribbon adajcent said gap.

2. A force measuring transducer comprising:
a circular washer-shaped body having parallel flat faces, a right-cylindrical peripheral surface disposed between said faces, and a central aperture therethrough;
a first piezoresistive semiconductor ribbon element secured to an arcuate portion of the peripheral surface of said body for providing an increase in electrical resistance with strain applied to said body in a given direction;
a second piezoelectric semiconductor ribbon element secured to an arcuate portion of said peripheral surface of said body in substantially the same plane as said first ribbon element and spaced apart from said first element for providing a decrease in electrical resistance with strain applied to said body in said given direction; and
bridge circuit means, including said first and second elements in conjugate arms thereof, for generating an electrical output signal indicative of force applied to said transducer.

3. A force measuring transducer comprising:
a right-cylindrical body having parallel end faces, a central aperture therethrough, and an integral flange portion extending from said end faces around the entire periphery thereof;
a ribbon of piezoresistive semiconductive material disposed in a single turn about a central portion of said body in a single plane and having a gap between the ends thereof sufficient to provide an electrical discontinuity between said ends;
a thin layer of adhesive for securing said ribbon to said body and for providing electrical insulation therebetween;
first and second lead means attached to corresponding ones of said ends and adapted to extend from said transducer for connection to a utilization circuit;
a potting material covering said ribbon and substantially filling the area between said flange portions; and
a layer of solid lubricant covering each of said faces and substantially co-extensive therewith.

4. A force measuring transducer comprising:
a washer-shaped body having parallel faces and a central aperture therethrough, and a shallow annular groove having a right-cylindrical surface about the periphery thereof;
a first plurality of semiconductor ribbons each having a piezoresistive characteristic which results in an increase in electrical resistance with a stress applied in a given direction, said ribbons being disposed in said groove and spaced apart in a first common plane;
conductor means connecting said first plurality of ribbons electrically in series;
first and second lead means attached to corresponding ones of the ends of said first series of ribbons and adapted to extend from said transducer for connection with a utilization circuit;
a second plurality of semiconductor ribbons, equal in number to said first plurality of semiconductor ribbons, having piezoresistive characteristics which result in a decrease in electrical resistivity with a stress, applied in said given direction, said second plurality of ribbons being disposed in said groove in a second common plane which is spaced apart from, and parallel to, said first common plane; and
a layer of solid lubricant carried by, and substantially co-extensive with, said parallel faces.

5. A force transducer responsive to axially applied loads comprising:
a right-cylindrical body having first and second parallel ends, a central aperture therethrough, and integral flange portions extending from, and extending about, the entire periphery of said end faces;
a plurality of ribbon-like semiconductor piezoresistive elements disposed in spaced-apart relationship about the periphery of a central portion of said body and having their major axes extending in a direction between said parallel ends;
a plurality of conductors, each of which is connected between a corresponding pair of said piezoresistive elements for serially interconnecting all but one pair of said piezoresistive elements;
bonding means for securing said piezoresistive elements and said conductors to said body; and
first and second lead means attached to, and extending from the terminal ends of the series-connected piezoresistive elements.

6. A transducer for electrically measuring stress in structural connection members which secure structural pieces together, comprising:
a spool-shaped body having a central bore extending therethrough and having an unrestricted outside surface for permitting radial expansion;
a pair of solid lubricant annular discs covering the opposite end faces of said body for permitting radial expansion and contraction of said body in response to axial forces applied to the opposite end surfaces of said discs;
a first plurality of piezoresistive semiconductor ribbon elements circumferentially spaced apart in the same plane about a central portion of said spool-shaped body, said elements having the property of increasing resistivity under stress applied in a given direction;
a second plurality of piezoresistive semiconductor ribbon elements circumferentially spaced apart in the same plane about another central portion of said spool-shaped body, said elements having the property of decreasing resistance with stress applied in said given direction; and conductor means connected to said first plurality of elements and said second plurality of elements for additively combining changes in their electrical resistance whereby electrical measurements may be obtained therefrom.

7. A moment indicating transducer comprising:

a circular disc-shaped body having a central aperture therethrough, said body being divided into a plurality of spaced apart radial sectors of the same increased thickness, each having opposing parallel faces perpendicular to the axis of said aperture;

a plurality of piezoresistive semiconductor ribbon elements each of which is disposed along the peripheral edge of a corresponding one of said radial sectors; and separate pairs of lead means connected to the ends of respective ones of said plurality of semiconductor elements.

8. A moment indicating transducer comprising:

a circular disc-shaped body divided into four radial sectors having opposing parallel faces and four intervening sectors being of the same reduced thickness;

a plurality of first piezoresistive semiconductor ribbon elements secured to the periphery of said radial sectors, and adapted to provide an increase in electrical resistance with strain applied in a given direction;

a second plurality of piezoresistive semiconductor ribbon element secured to the periphery of corresponding ones of said radial sectors adjacent corresponding ones of said first semiconductor elements and adapted to provide a decrease in electrical resistance with strain applied in said given direction; and circuit means interconnecting said semiconductor elements for additively combining the resistances of said first and second plurality of semiconductor elements.

9. A moment indicating transducer comprising:

a circular disc-shaped body divided into four radial sectors having opposing parallel faces and four intervening sectors being of the same reduced thickness;

a plurality of piezoresistive semiconductor ribbons disposed in spaced apart relationship about the periphery of said radial sectors, and having their major axes extending in a direction between said faces;

a plurality of conductors connecting said semiconductor ribbons into four separate series circuits; and pairs of lead means attached to each of said series of circuits, and extending from said transducer.

10. An electromechanical force sensitive element comprising:

a substantially cylindrical body having a central bore extending therethrough; a plurality of circumferentially spaced apart, radially extending sectors of the same increased thickness disposed between the periphery and said bore of said body; and a plurality of piezoresistive semiconductor ribbon elements secured to the peripheral terminus of corresponding ones of said sectors for detecting circumferential strain produced in said body when the ends of the body are subjected to an axial force.

11. An electromechanical force measuring transducer comprising:

a circular body having opposing, flat, loadbearing surfaces, the periphery of said body having an annular recess having a right cylindrical surface;

first and second piezoroesistive semiconductor ribbon elements circumferentially disposed within said recess and secured to said cylindrical surface for detecting circumferential strain produced in the body mid-section when said load bearing surfaces of the body are subjected to axial forces; and a pair of coaxial solid lubricating discs co-extensive with said load bearing surfaces to permit radial expansion and contraction of said body in response to radial forces applied thereto.

References Cited

UNITED STATES PATENTS

| 2,775,887 | 1/1957 | Hines | 338—5 |
| 3,088,083 | 4/1963 | Ward | 338—5 |

RICHARD M. WOOD, *Primary Examiner.*

W. D. BROOKS, *Assistant Examiner.*